(12) United States Patent
Hermanson et al.

(10) Patent No.: US 7,728,216 B2
(45) Date of Patent: Jun. 1, 2010

(54) CONTROLLER FOR MULTIPLE CIRCUITS OF DISPLAY LIGHTING

(75) Inventors: Terry Hermanson, New York, NY (US); Huang Meng-Suen, Hong Kong (CN)

(73) Assignee: Mr. Christmas Incorporated, New York, NY (US)

( * ) Notice: Subject to any disclaimer, the term of this patent is extended or adjusted under 35 U.S.C. 154(b) by 10 days.

(21) Appl. No.: 11/902,109

(22) Filed: Sep. 19, 2007

(65) Prior Publication Data
US 2009/0072763 A1    Mar. 19, 2009

(51) Int. Cl.
*G10H 1/00* (2006.01)
*G10H 1/18* (2006.01)

(52) U.S. Cl. .............. 84/615; 84/616; 84/618; 84/645; 84/653; 84/654; 84/656; 84/464 R; 84/464 A

(58) Field of Classification Search .......... None
See application file for complete search history.

(56) References Cited

U.S. PATENT DOCUMENTS

| | | | | |
|---|---|---|---|---|
| 4,109,231 A * | 8/1978 | Krouse | ............... | 338/200 |
| 4,167,783 A * | 9/1979 | Mitchell | .............. | 362/236 |
| 4,331,062 A * | 5/1982 | Rogers | .............. | 84/478 |
| 4,417,824 A * | 11/1983 | Paterson et al. | ...... | 400/477 |
| 4,434,454 A * | 2/1984 | Day | .................. | 362/238 |
| 5,394,784 A * | 3/1995 | Pierce et al. | ........ | 84/464 A |
| 5,461,888 A * | 10/1995 | Jansson et al. | ....... | 68/181 R |
| 5,557,055 A * | 9/1996 | Breitweiser, Jr. | ...... | 84/478 |
| 5,725,409 A * | 3/1998 | Brunton | .............. | 446/2 |
| 5,957,564 A * | 9/1999 | Bruce et al. | ......... | 362/84 |
| 6,008,551 A * | 12/1999 | Coray | ............... | 307/157 |
| 2006/0023454 A1* | 2/2006 | Koren | ................ | 362/253 |
| 2006/0123978 A1* | 6/2006 | Kubitz et al. | ......... | 84/600 |
| 2009/0014460 A1* | 1/2009 | Kobus et al. | ......... | 221/135 |

* cited by examiner

*Primary Examiner*—Marlon T Fletcher
(74) *Attorney, Agent, or Firm*—Fitzpatrick, Cella, Harper & Scinto

(57) ABSTRACT

A method for controlling a plurality of light sources. Control signals corresponding to notes of a music file are generated to enable selected ones of a plurality of receptacles to be powered. The plurality of receptacles comprises a first plurality of receptacles and a second plurality of receptacles, and the first plurality of receptacles are powered more frequently than the second plurality of receptacles. The plurality of receptacles is adapted to supply power to the plurality of light sources. A pleasing twinkling effect can be created even if light sources are not coupled to one of the plurality of receptacles.

12 Claims, 5 Drawing Sheets

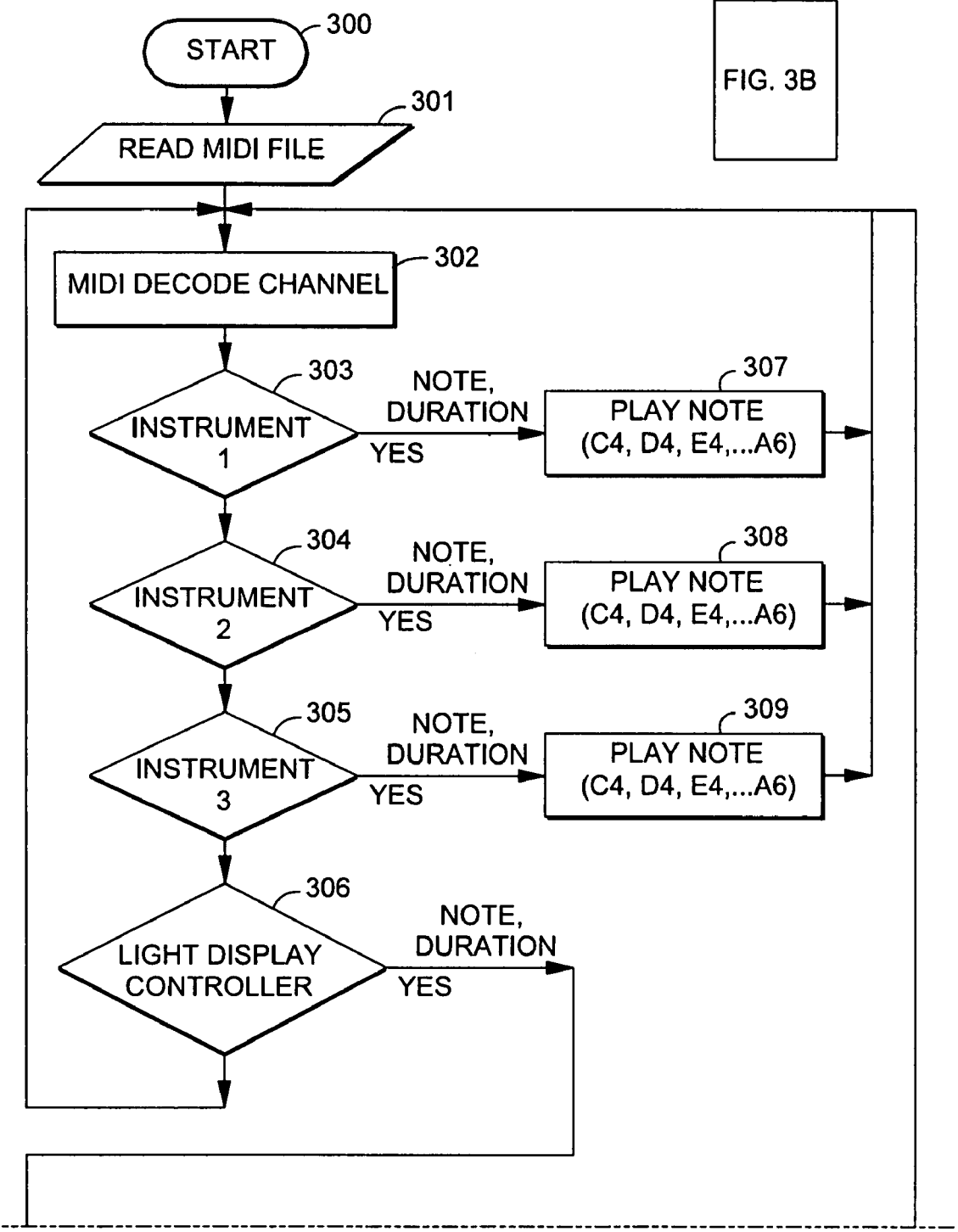

TABLE I

| NOTE | RECEPTACLE |
|---|---|
| C3 | 31 |
| D3 | 31, 33 |
| E3 | 32 |
| F3 | 32, 34 |
| G3 | 35 |
| A3 | 36 |
| C5 | 31, 32, 33, 34, 35, 36 |

FIG. 4

CONTROLLER FOR MULTIPLE CIRCUITS OF DISPLAY LIGHTING

BACKGROUND OF THE INVENTION

1. Field of the Invention

The present invention relates to controlling light sources, and more particularly to controlling a plurality of light sources based on notes of a music file.

2. Description of the Related Art

Decorative display devices, coupled with decorative lights, are an important element of any holiday season, especially Christmas. Decorative lighting during the Christmas season includes Christmas tree lights, exterior lights on buildings, trees and foliage, and interior lights displayed in windows, and throughout homes or buildings.

A twinkling effect is a desirable characteristic of decorative lights. A twinkling effect may be achieved by flashing individual or multiple lights on and off in a regular or random pattern.

Hence, it is desirable to continue to introduce new and innovative ways to create pleasing effects for display and illumination of decorative elements, including twinkling effects, and the present invention further addresses this need.

SUMMARY OF THE INVENTION

The foregoing and other limitations are overcome by a method for controlling a plurality of light sources and a device that operates in accordance with the method.

According to one example embodiment of the invention, in the method, control signals corresponding to notes of a music file are generated to enable selected ones of a plurality of receptacles to be powered. The plurality of receptacles comprises a first plurality of receptacles and a second plurality of receptacles, and the first plurality of receptacles are powered more frequently than the second plurality of receptacles. The plurality of receptacles is adapted to supply power to the plurality of light sources. In this manner, a pleasing twinkling effect is created even if light sources are not coupled to the second plurality of receptacles.

The music file can be, for example, a MIDI file. The plurality of receptacles can include, for example, AC receptacles, and the plurality of light sources can include, for example, light strings having AC plugs adapted to be coupled to respective ones of the receptacles. The control circuit can generate the signal based on at least one of the notes of the music file, and an amplifier can amplify the signal. Multiple receptacles can be powered for at least one note.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 4 is a table specifying a configuration of a control pattern in accordance with an example embodiment of the invention.

DETAILED DESCRIPTION OF THE INVENTION

Figure 1:
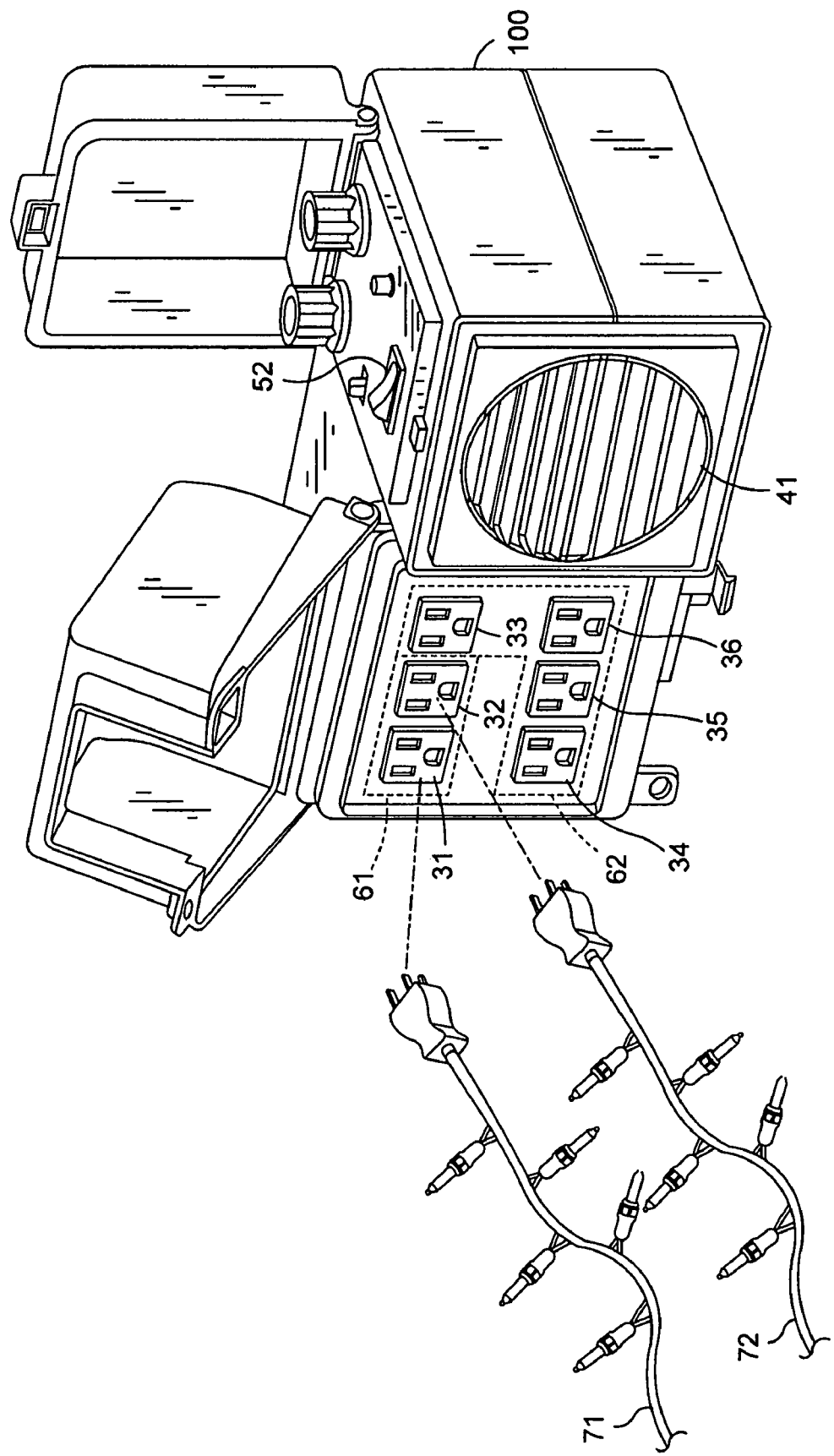
FIG. 1 is a perspective view of a display device in accordance with an example embodiment of the invention.

FIG. 1 is a perspective view of a display device 100 in accordance with an example embodiment of the invention. Receptacles 31 to 36 (see also FIG. 2) are AC power receptacles adapted to supply power in response to control signals received from programmable control circuit 10 shown in FIG. 2. Receptacles 31 to 36 are electrically coupled to light sources, such as, for example, light strings 71 and 72 having AC plugs, or any other suitable type of circuit of display lighting. Receptacles 31 and 32 form a first group of receptacles 61, and receptacles 33 to 36 form a second group of receptacles 62. Speaker 41 is adapted to generate an audible signal based on a signal (e.g., an analog signal) generated by programmable control circuit 10.

Display device 100 receives 120VAC, 60 Hz AC power from an AC power receptacle via AC plug 54 (shown in FIG. 2), although in other embodiments, other types of power/voltage can be used. Light sources can be plugged into receptacles 31 to 36, and display device 100 is activated via switch 52.

Once activated, display device 100 emits an audible signal through speaker 41 and continuously activates and deactivates light sources (coupled to receptacles 31 to 36) based on notes of a music file (13 of FIG. 2) stored in programmable control circuit 10, as will be described in more detail below. In this manner, music can be played, and the powering of the lights is synchronized with the notes of a song such that the light display can be perceived as a visual representation of the song.

In an example embodiment of the invention, display device 100 powers receptacles in the first group 61 (i.e., receptacles 31 and 32) more frequently than receptacles in the second group 62 (i.e., receptacles 33 to 36), as described below in the description of FIG. 3.

Because light sources coupled to receptacles in the first group 61 are powered more frequently than light sources coupled to receptacles in the second group 62, the powering of the lights will still appear to be synchronized with the musical notes if light sources are not coupled to receptacles in the second group 62. For example, display device 100 can be configured to power receptacles in the first group 61 in a manner such that about sixty or seventy percent of the time at least one light source is powered and emits light, and so that light sources connected to receptacles in the second group 62 are powered about forty or thirty percent of the time.

Figure 2:
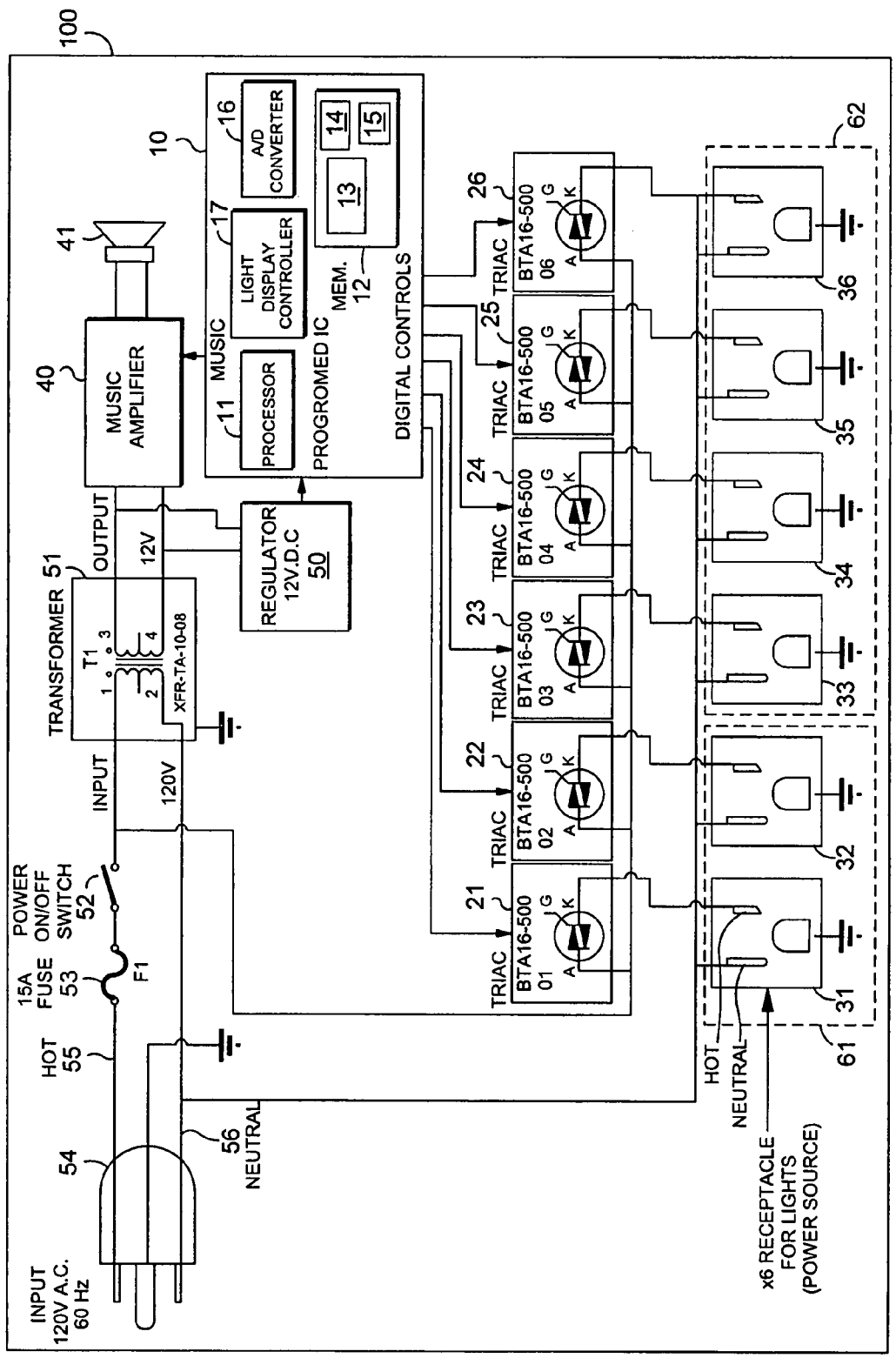
FIG. 2 is a schematic diagram of the display device in accordance with an example embodiment of the invention.

FIG. 2 is a schematic diagram of the display device in accordance with an example embodiment of the invention. Programmable control circuit 10 has a processor 11, a memory 12, a digital-to-analog (D/A) converter 16, and light display controller 17. Memory 12 stores an audio sample such as, for example, a music file 13, and also stores control pattern 14 and program instructions 15 for performing a method such as that of FIG. 3 described below. Music file 13 is a Musical Instrument Digital Interface (MIDI) file, but it can also be any other suitable type of music file that represents a sequence of instructions for playing musical notes. Each instruction specifies one or more musical notes to be played (simultaneously or otherwise), a duration for playing each note, and an output channel (i.e., path through which each note can be signaled or played) for each note. Each output channel is coupled to a device responsive to the instruction.

The devices can include, for example, a digital-analog converter (e.g., A/D converter 16), a light display controller (e.g., 17), or any other suitable type of device capable of generating a signal which can be used to power a source of user perceptible signals (e.g., speaker 41 and light strings 71 and 72), based on instructions specified in music file 13.

Music file 13 specifies output channel(s) corresponding to D/A converter 16, and an output channel corresponding to light display controller 17. Control pattern 14 specifies which of receptacles 31 to 36 to activate or deactivate in response to a note of music file 13.

D/A converter 16 generates analog signals based on instructions specified in music file 13. The analog signals generated by D/A converter 16 are received by amplifier 40, which amplifies those analog signals and forwards them to speaker 41. Speaker 41 receives the amplified analog signals from amplifier 40 and outputs corresponding audible signals.

Light display controller 17 generates control signals for activating and deactivating receptacles 31 to 36 based on notes of music file 13 and control pattern 14. Light display controller 17 can be implemented as an electric or electronic circuit or as program instructions stored as part of program instructions 15.

Programmable control circuit 10 and amplifier 40 can be powered by a DC voltage, such as, for example, a 12VDC voltage. Transformer 51 converts, for example, a 120VAC voltage received via AC plug 54 to a 12VAC voltage, and regulator 50 converts the 12VAC voltage received from transformer 51 to a 12VDC voltage, which is supplied to programmable control circuit 10 and amplifier 40. It should be noted that in other embodiments, other types and levels of voltage/power, and methods of voltage/power conversion can be used.

Neutral supply wire 56 is coupled to receptacles 31 to 36. Hot supply wire 55 is coupled to receptacles 31 to 36 via TRIodes for Alternating Current (TRIAC) 21 to 26, respectively. TRIACs 21 to 26 are electronic switches that conduct current when a control signal is applied to their control terminals (gates). The gates of TRIACs 21 to 26 are electrically coupled to programmable control circuit 10 for receiving control signals. As long as a control signal is present at the gate of a TRIAC, the TRIAC forms a closed circuit between hot supply wire 55 and the corresponding receptacle, thereby activating the receptacle. The hot supply wire of AC plug 54 is coupled with fuse 53 for safety protection against accidental overload or fault.

Figure 3B:
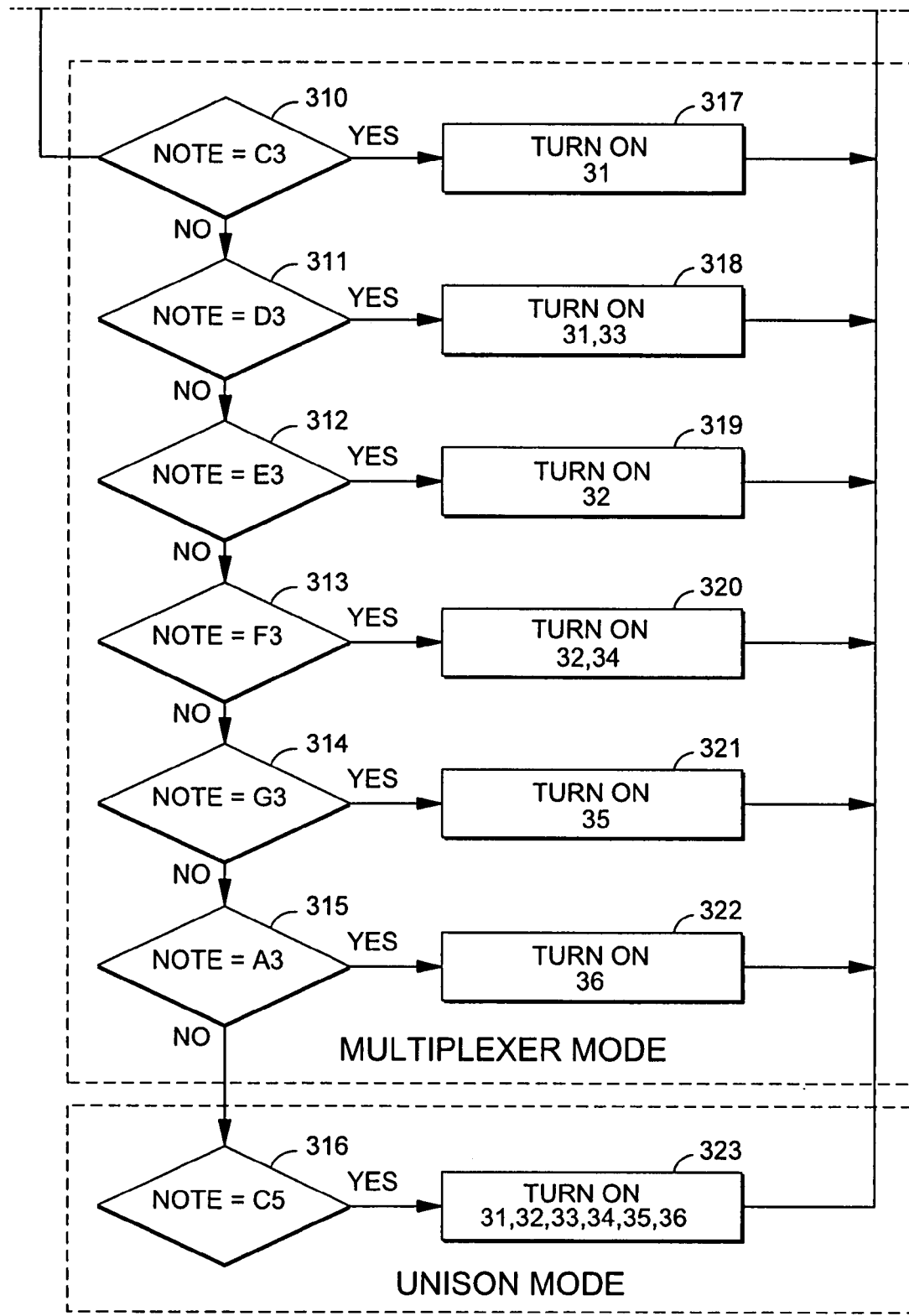
FIG. 3 is a flow diagram of a process for controlling light sources in accordance with an example embodiment of the invention.

FIG. 3 is a flow diagram of a process for controlling light sources in accordance with an example embodiment of the invention. In block 300, switch 52 is closed and display device 100 is activated. Processing proceeds to block 301 where programmable control circuit 10 reads music file 13. Processing then proceeds to block 302 where programmable control circuit 10 decodes the first MIDI instruction to determine the notes to be played and the output channels for playing each note. Thereafter, programmable control circuit 10 sends the data for each note through the corresponding output channel, and lights electrically (coupled to receptacles 31 to 36) are activated (blocks 317 to 323), and an audible signal is simultaneously outputted (played) by speaker 41 (blocks 307 to 309), based on notes of music file 13 and control pattern 14.

For example, programmable control circuit 10 can be configured such that, three output channels, "Instrument 1", "Instrument 2", and "Instrument 3" (blocks 303, 304, and 305, respectively) correspond to D/A converter 16. D/A converter 16 generates an analog signal with a different music quality depending on which one of the channels "Instrument 1", "Instrument 2", and/or "Instrument 3" receives note data, such that D/A converter 16 can simulate three musical instruments.

If data for one or more notes is sent to output channels "Instrument 1", "Instrument 2", and/or "Instrument 3" ("YES" at blocks 303, 304, and 305, respectively), the corresponding note(s) is played (simultaneously or individually) at blocks 307, 308, and 309, respectively. At blocks 307 to 309, D/A converter 16 generates a music analog signal based on note data received at blocks 303 to 305.

For example, as illustrated in the example shown in FIG. 3, each of "Instrument 1", "Instrument 2", and "Instrument 3" can play one or more of notes C4, D4, E4, F4, G4, A4, B4, C5, D5, E5, F5, G5, A5, B5, C6, D6, E6, F6, G6, and A6 (where each note is specified by a note and an octave number) at blocks 307, 308, and 309, respectively.

The music analog signal is sent to amplifier 40 which amplifies the signal and sends it to speaker 41, where the analog signal is outputted as an audible signal (played) for the duration specified in music file 13. The audible signal has a pitch, frequency, and other sound (musical) quality as specified by the file 13. Control then passes back to block 302 where the method continues as described above.

If data is sent to the output channel corresponding light display controller 17 ("YES" at block 306), the data is used by light display controller 17 to generate control signals for activating and/or deactivating one or more of the receptacles 31 to 36 (blocks 317 to 323) depending on the note(s) specified by the data, as well as the lights electrically coupled thereto (not shown in FIG. 2), based on control pattern 14.

As illustrated in the example shown in FIG. 3, if note C3 is specified, receptacle 31 is activated, if note D3 is specified, receptacles 31 and 33 are activated, if note E3 is specified, receptacle 32 is activated, if note F3 is specified, receptacles 32 and 34 are activated, if note G3 is specified, receptacle 35 is activated, and if note A3 is specified, receptacle 36 is activated (Multiplexer Mode). If note C5 is specified, receptacles 31 to 36 are activated simultaneously (Unison Mode).

An exemplary configuration of control pattern 14 is specified in Table I shown in FIG. 4. Table I specifies an example of which of receptacles 31 to 36 are activated in response to a particular note being played (i.e., Multiplexer Mode), and specifies a note (e.g., C5) for which all (or plural) receptacles 31 to 36 are activated (i.e., Unison Mode).

As illustrated in FIG. 3, receptacles 31 to 36 are only activated in response to associated notes listed in Table I being played, but in other embodiments, receptacles 31 to 36 may be activated in response to other notes being played. Similarly, referring again to FIG. 3, only notes C4 to A6 are played at blocks 307, 308, and 309, but in other embodiments, other notes may be played at blocks 307, 308, and 309.

Each note is specified by a note and an octave number. For example, in Table I, "C3" represents note "C" played at octave "3". In the example of Table I, if note C3, D3, or C5 is played ("YES" at blocks 310, 311, and 316, respectively), light display controller 17 generates a control signal for activating receptacle 31 (blocks 317, 318, and 323, respectively), and for activating receptacle 33 (if note D3 or C5 is played). The control signal for activating receptacle 31 is provided to TRIAC 21 which forms a closed circuit between hot supply wire 55 and receptacle 31, thereby activating receptacle 31 as well as the lights electrically coupled thereto (not shown in FIG. 2). If note D3 or C5 is played, the control signal for activating receptacle 33 is also provided to TRIAC 23 which forms a closed circuit between hot supply wire 55 and receptacle 33, thereby activating receptacle 33 as well as the lights electrically coupled thereto (not shown in FIG. 2). Light display controller 17 controls TRIACs 21 and 23 for the duration specified in the decoded MIDI instruction, to maintain activation of receptacle 31, receptacle 33, and lights for that duration. At the end of the specified duration, light display controller 17 controls TRIACs 21 and 23 to open the circuit between wire 55 and receptacles 31 and 33, respectively, thereby deactivating receptacle 31, receptacle 33, and lights.

After lights are activated and the note(s) are simultaneously played or sounded (as specified by the instruction decoded at block 302), processing returns to block 302 where the next instruction is decoded. This process continues until switch 52 is opened and display device 100 is deactivated.

In this manner, a song can be played, and the powering of the lights is synchronized with the notes of the song such that the light display can be perceived as a visual representation of the song.

By configuring control pattern 14 as specified in the example of Table I, where receptacles 31 and 32 are associated with about at least two thirds of the notes in Multiplexor Mode (blocks 310 to 315 and 317 to 322), more activity is generated in receptacles 31 and 32 than in receptacles 33 to 36.

For example, if note C3, D3, E3, F3, or C5 is played ("YES" at blocks 310 to 313 and 316, respectively), light display controller 17 generates a control signal for activating at least one (or both in the case of note C5) of receptacle 31 or 32 (blocks 317 to 320, and 323, respectively), as specified in Table I, although receptacles 33 to 36 also are activated for note C5. Therefore, even if light sources are not coupled to receptacles 33 to 36, the powering of the lights will still appear to be synchronized with the notes of the song. For example, if light sources are not coupled to receptacles 33 to 36, light sources can be powered for notes C3, D3, E3, F3 and C5 as long as light sources are coupled to receptacles 31 and 32.

It should be noted that although only the receptacles 31 to 36 and TRIACs 21 to 26 are shown in FIGS. 1 and/or 2, the total number of receptacles and TRIACs can vary and are not limited to the number of receptacles and TRIACs depicted in FIGS. 1 and 2. Also, while components 11, 13, 14, 15, 16, and 17 are shown as part of programmable control circuit 10 in the above described embodiment, in other embodiments, one or more of those components may be separate from programmable control circuit 10. Moreover, in other embodiments the invention can be used to control the powering of other sources of user-perceptible signals besides light and audible signals. Also, the association of notes with particular receptacles indicated in FIGS. 3 and 4 is merely an example, and in other example embodiments notes may be associated with other receptacles, depending on applicable operating criteria.

The invention has been described above with respect to a particular illustrative embodiment. It is understood that the invention is not limited to the above-described embodiment and that various changes and modifications may be made by those skilled in the relevant art without departing from the spirit and scope of the invention.

What is claimed is:

1. A device for controlling a plurality of light sources comprising:
    a plurality of receptacles, constructed to supply power to the plurality of light sources;
    a memory that stores a music file and a control pattern;
    a control circuit, operable to read the music file, and to generate control signals to enable selected ones of the receptacles to be powered, the control signals corresponding to notes of the music file;
    wherein the plurality of receptacles comprises a first plurality of receptacles and a second plurality of receptacles, and the control circuit generates control signals to power the first plurality of receptacles more frequently than the second plurality of receptacles based on the control pattern, which specifies that more activity is to be generated in the first plurality of receptacles than in the second plurality of receptacles.

2. A device according to claim 1, wherein the music file is a MIDI file.

3. A device according to claim 1, wherein the plurality of receptacles include AC receptacles.

4. A device according to claim 1, wherein the plurality of light sources include light strings having AC plugs constructed to be coupled to respective ones of the receptacles.

5. A device according to claim 1, further comprising an amplifier constructed to amplify a signal received from the control circuit, the control circuit generating the signal based on at least one of the notes of the music file.

6. A device according to claim 1, wherein multiple receptacles are powered for at least one note.

7. A method for controlling a plurality of light sources, comprising:
    using a control circuit to perform the steps of:
    reading a music file stored in a memory;
    generating control signals to enable selected ones of a plurality of receptacles to be powered, the control signals corresponding to notes of the music file,
    wherein the plurality of receptacles comprises a first plurality of receptacles and a second plurality of receptacles, and the control circuit is used to generate control signals to power the first plurality of receptacles more frequently than the second plurality of receptacles, based on a control pattern, stored in the memory, that specifies that more activity is to be generated in the first plurality of receptacles than in the second plurality of receptacles; and
    wherein the plurality of receptacles is constructed to supply power to the plurality of light sources.

8. A method according to claim 7, wherein the music file is a MIDI file.

9. A method according to claim 7, wherein the plurality of receptacles include AC receptacles.

10. A method according to claim 7, wherein the plurality of light sources include light strings having AC plugs constructed to be coupled to respective ones of the receptacles.

11. A method according to claim 7, further comprising amplifying a signal generated based on at least one of the notes of the music file.

12. A method according to claim 7, wherein multiple receptacles are powered for at least one note.

* * * * *